US008028676B2

United States Patent
Ancimer et al.

(10) Patent No.: US 8,028,676 B2
(45) Date of Patent: Oct. 4, 2011

(54) FUEL INJECTION CONTROL METHOD FOR A DIRECT INJECTION GASEOUS-FUELLED INTERNAL COMBUSTION ENGINE

(75) Inventors: Richard Ancimer, Columbus, IN (US); Olivier P. M. Lebastard, Burnaby (CA); Jeffrey J. Thompson, Vancouver (CA); Greg A. Batenburg, Delte (CA); Stewart Whitfield, Richmond (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 12/906,996

(22) Filed: Oct. 18, 2010

(65) Prior Publication Data

US 2011/0088655 A1      Apr. 21, 2011

Related U.S. Application Data

(63) Continuation of application No. PCT/CA2009/000576, filed on Apr. 28, 2009.

(30) Foreign Application Priority Data

Apr. 30, 2008   (CA) ..................................... 2626995

(51) Int. Cl.
F02D 41/04      (2006.01)
F02M 51/00      (2006.01)
G06F 19/00      (2011.01)
(52) U.S. Cl. ........................... 123/299; 123/527; 701/104
(58) Field of Classification Search .................. 123/299, 123/295, 527–529, 300, 305, 478, 480, 27 GE; 701/103–105, 115
See application file for complete search history.

(56) References Cited

U.S. PATENT DOCUMENTS

| | | | |
|---|---|---|---|
| 5,941,210 A * | 8/1999 | Hill et al. ....................... | 123/305 |
| 5,983,156 A | 11/1999 | Andrews | |
| 6,173,694 B1 | 1/2001 | Kamura et al. | |
| 7,040,281 B2 | 5/2006 | Crawford et al. | |
| 7,073,485 B2 | 7/2006 | Truscott et al. | |
| 7,104,255 B2 | 9/2006 | Hashima et al. | |
| 7,325,529 B2 | 2/2008 | Ancimer et al. | |
| 7,463,967 B2 * | 12/2008 | Ancimer et al. .............. | 701/104 |
| 2006/0047406 A1 | 3/2006 | Chatfield et al. | |

FOREIGN PATENT DOCUMENTS

JP      2003-13784 A   *   1/2003

(Continued)

OTHER PUBLICATIONS

Office Action issued by the Canadian Intellectual Property Office on Aug. 12, 2008 in connection with Canadian Patent Application No. 2,626,995.

(Continued)

*Primary Examiner* — Hieu T Vu
(74) *Attorney, Agent, or Firm* — McAndrews, Held & Malloy, Ltd.

(57) ABSTRACT

The method comprises receiving from the vehicle controller, values associated with the engine speed and of another parameter indicative of the engine operating conditions, such as the total fuelling amount, and controlling the fuel injection parameters according to the engine state, which, for example, can include a normal operation mode, a filter regeneration mode, an engine protection mode, high or low transient load modes, and operating at different altitudes, through algorithms implemented in an electronic controller.

36 Claims, 8 Drawing Sheets

FOREIGN PATENT DOCUMENTS

WO      2006122427      11/2006

OTHER PUBLICATIONS

International Search Report issued on Jul. 28, 2009, in connection with International Application No. PCT/CA2009/000576.

Written Opinion of the International Searching Authority issued on Jul. 28, 2009, in connection with International Application No. PCT/CA2009/000576.

International Preliminary Report on Patentability issued on Nov. 2, 2010, in connection with International Application No. PCT/CA2009/000576.

* cited by examiner

FUEL INJECTION CONTROL METHOD FOR A DIRECT INJECTION GASEOUS-FUELLED INTERNAL COMBUSTION ENGINE

CROSS-REFERENCE TO RELATED APPLICATION(S)

This application is a continuation of International Application No. PCT/CA2009/000576, having an international filing date of Apr. 28, 2009, entitled "Fuel Injection Control Method For A Direct Injection Gaseous-Fuelled Internal Combustion Engine". The '576 international application claimed priority benefits, in turn, from Canadian Patent Application No. 2,626,995 filed Apr. 30, 2008. The '576 international application is hereby incorporated by reference herein in its entirety.

FIELD OF THE INVENTION

The present invention relates to a fuel injection control method for a direct injection gaseous-fuelled internal combustion engine based on a parameter indicative of the engine state correlated with the engine speed and another pre-selected parameter indicative of the engine operating conditions.

BACKGROUND OF THE INVENTION

Presently, most over-the-road heavy vehicles are fuelled by gasoline or diesel fuel. Because both gasoline and diesel fuelled internal combustion engines generate a considerable amount of pollutants such as oxides of nitrogen (NOx) and particulate matter (PM), engine manufacturers will be required to make improvements to their engines in order to comply with the new government regulatory standards regarding lower emissions of combustion products.

For diesel-cycle engines one approach that shows a significant improvement in lowering emissions involves substituting some of the diesel fuel with gaseous fuels such as natural gas, pure methane, ethane, liquefied petroleum gas, lighter flammable hydrocarbon derivatives, hydrogen, and blends of such fuels. Gaseous fuels are generally defined herein as fuels that are gaseous at atmospheric pressure and zero degrees Celsius. Whereas liquid fuels such as diesel are injected at very high pressures in order to atomize the fuel, gaseous fuels can be injected into an engine's combustion chamber at lower pressure because no extra energy is required for fuel atomization.

An advantage of substituting a gaseous fuel for diesel fuel is that the selected gaseous fuel can be one that burns cleaner than diesel fuels while preserving the high efficiency and high torque of the conventional diesel engines.

Another advantage of gaseous fuels is that, as a resource, such fuels are more widely distributed around the world and the amount of proven reserves of natural gas is much greater, compared to proven oil reserves.

Gaseous fuels can also come from renewable sources such as vent gases from garbage dumps and sewage treatment plants. Hydrogen can be produced with electricity generated from renewable sources such as wind power and hydro-electric dams.

However, some modifications are required to a conventional diesel engine to allow gaseous fuels to be substituted for diesel fuel. In a diesel engine, the heat produced by the mechanical compression of the fuel and air mixture auto-ignites the liquid diesel fuel charge at or near the end of the piston's compression stroke. Under the same conditions, gaseous fuels such as natural gas will not reliably auto-ignite. Therefore, in order to burn a gaseous fuel in a conventional engine with the same compression ratio without having to completely redesign the engine, some additional device is required to assist with ignition of the gaseous fuel, such as a hot surface provided by a glow plug, or a fuel injection valve for introducing a pilot fuel. The pilot fuel can be a small quantity of diesel fuel, whereby the auto-ignition of the pilot fuel triggers the ignition of gaseous fuel.

Gaseous fuelled engines have to respond to different power and load requirements according to different conditions, either external to the engine system or internal to the engine system, while preserving or further reducing a vehicle's emissions rates. Examples of conditions that are external to the engine include ambient temperature, cold start and high or low transient loads depending upon where the vehicle travels, such as city or highway conditions or different altitudes. Examples of conditions internal to the engine include, predefined engine operating modes such as an engine protection mode or a particulate filter regeneration mode.

It is presently known in the diesel engine industry, and particularly in the heavy duty truck industry using diesel engines, to select engine fuelling strategies based on the geographic conditions, wherein the geographic conditions are either presumed from certain engine and/or vehicle operational parameters (for example, engine acceleration) or more accurately determined based on the vehicle location which is communicated through a receiver associated with the travelling vehicle as described in U.S. Pat. No. 5,983,156. Such a system comprises a control computer with a memory having a number of different engine fuelling maps stored therein. Each engine fuelling map includes a mathematical function, table of values or the like, mapping engine fuelling requests to appropriate fuel quantities, fuel injection timing, and the like. The control computer responds to the radio signals relating to the vehicle location to determine therefrom the vehicle's geographical location, retrieves from the memory unit an appropriate engine fuelling map and controls the fuelling system according to the appropriate engine fuelling map.

Due to the modifications to conventional diesel engines that are required for allowing gaseous fuels to be substituted for diesel fuel, a more sophisticated electronic engine control is necessary in order to implement new combustion strategies for gaseous fuelled engines. For example, the engine control strategies of a diesel engine that has been modified to operate with gaseous fuel has to take into consideration the timing for triggering the ignition assisted devices, while also coordinating such timing with the timing for the gaseous fuel injection to achieve efficient combustion.

While it has been demonstrated that by injecting a gaseous fuel directly into the combustion chamber of an internal combustion engine, it is possible to at least match the power output, performance, and efficiency of a conventional diesel engine, there are a number of factors that make gaseous-fuelled engines different from conventional diesel-fuelled engines, and these differences require control methods that are different from those developed for conventional diesel engines.

SUMMARY OF THE INVENTION

A fuel injection control method is provided for an internal combustion engine that is fuelled with a gaseous fuel that is injected directly into a combustion chamber through a fuel injection valve. The method comprises receiving input data indicating values associated with engine speed and a preselected parameter indicative of engine operating conditions, and a parameter indicative of an engine state that is one of a predefined plurality of engine states. During each engine's compression stroke, the method further comprises controlling injection of the gaseous fuel according to the values associated with engine speed and the pre-selected parameter indicative of the engine operating conditions, as a function of the value associated with the parameter indicative of the engine state.

In a preferred method, the plurality of predefined engine states comprises a normal operation mode, a particulate filter regeneration mode, an engine protection mode, a high transient load mode, a low transient load mode or an engine mode corresponding to the altitude at which the engine is operating.

The pre-selected parameter indicative of the engine operating conditions can be one of a total fuelling amount, an engine load, an engine torque, a throttle position, or an intake manifold pressure.

In a preferred method, controlling the injection of the gaseous fuel comprises controlling gaseous fuel rail pressure or timing for gaseous fuel injection. The gaseous fuel rail pressure can be selected from one of a plurality of look-up tables, which are each associated with one of the predefined plurality of engine states, wherein the table values correct gaseous fuel rail pressure based on the engine speed and to the total fuelling amount and the selected gaseous fuel rail pressure is selected from the table associated with the engine state that matches the input data associated with the engine state.

Controlling the injection of the gaseous fuel can comprise controlling on-time for gaseous fuel injection. The on-time for gaseous fuel injection can be selected from one of a plurality of look-up tables, which are each associated with one of the predefined plurality of engine states, wherein the table values correct on-time based on gaseous fuel fuelling values for gaseous fuel injection and the selected on-time is selected from the table associated with the engine state that matches the input data associated with the engine state. The on-time values for gaseous fuel injection from the look-up tables can also be corrected by a correction factor obtained from look-up tables that correlate the correction factor to engine speed and gaseous fuel fuelling based on the engine state. The on-time values for gaseous fuel injection are further corrected by a correction factor dependent on gaseous fuel rail pressure and the engine state.

When the engine employs a pilot fuel to assist with ignition of the gaseous fuel, the method can further comprise controlling a plurality of pilot fuel injection parameters according to engine speed and the pre-selected parameter indicative of the engine operating conditions, based on the parameter indicative of the engine state. Accordingly, pilot fuel rail pressure can be one of the pilot fuel injection parameters. The pilot fuel rail pressure can be selected from one of a plurality of look-up tables, which are associated with one of the predefined plurality of engine states, wherein the table values correct pilot fuel rail pressure based on the engine speed and the total fuelling amount and the selected pilot fuel rail pressure is selected from the table associated with the engine state that matches the input data associated with the engine state. In addition, the pilot on-time can be one of the pilot fuel injection parameters, and the pilot on-time can be selected from one of a plurality of look-up tables, which are each associated with one of the predefined plurality of engine states, wherein the table values correct the pilot on-time based on pilot fuel fuelling values and the selected pilot on-time is selected from the table associated with the engine state that matches the input data associated with the engine state. The pilot on-time values can be further corrected by another correction factor obtained from one of a plurality of look-up tables, which are each associated with one of the predefined plurality of engine states, wherein the table value correct the pilot on-time based on measured pilot fuel rail pressure and the further corrected pilot on-time is selected from the table associated with the engine state that matches the input data associated with the engine state. The pilot fuel fuelling values can be selected from one of a plurality of look-up tables, which are each associated with one of the predefined plurality of engine states, wherein the table values correct pilot fuel fuelling values based on the engine speed and the total fuelling amount and the selected pilot fuel fuelling value is selected from the table associated with the engine state that matches the input data associated with the engine state. The pilot fuel fuelling values can be corrected by a multiplication factor based on a measured engine coolant temperature.

One of the engine states can be "run-on-pilot" which is a state where the engine is fuelled only with pilot fuel. In this state on-time for gaseous fuel injection is set to zero.

Pilot fuel injection timing can also be one of the pilot fuel injection parameters. The pilot fuel injection timing can be selected from a plurality of pilot fuel injection timing values corresponding to the engine state, each being calculated depending on a pilot on-time and on a separation time and taking into consideration a gaseous fuel injection timing. The separation time is selected from one of a plurality of look-up tables that correlate the separation time to the engine speed and to the total fuelling amount based on the engine state, and the selected separation time is selected from the table associated with the engine state that matches the input data associated with the engine state.

A fuel injection control method is provided for an internal combustion engine system that is fuelled with a gaseous fuel that is injected directly into a combustion chamber. The method comprises receiving data inputs comprising engine speed, a total fuelling amount based on a commanded engine output, and a parameter indicative of an engine state; accessing a plurality of tables, each one of the plurality of tables being filled with correction data associated with a different predefined engine state wherein the correction data correlates to at least one of the other data inputs; and retrieving a correction factor from a selected one of the plurality of tables that is associated with the engine state data input and applying the correction factor to calculate a corrected fuel injection parameter that is used for controlling injection of the gaseous fuel. The predefined engine states comprise at least two of: (i) a normal operation mode, (ii) a particulate filter regeneration mode, (iii) an engine protection mode, (iv) a high transient load mode, (v) a low transient load mode, and (vi) an engine mode corresponding to the altitude at which the engine is operating.

The corrected fuel injection parameter can be one or both of gaseous fuel rail pressure and on-time for gaseous fuel injection.

The method can further comprise correcting the corrected fuel injection parameter with more than one correction factor. In this embodiment, the method comprises retrieving an additional correction factor by accessing additional tables, each one of the additional tables being filled with correction data associated a different predefined engine state, wherein the correction data correlates to at least one of the other data inputs; and correcting the corrected fuel injection parameter a second time by applying to it the additional correction factor to calculate a twice corrected fuel injection parameter. For example, on-time for gaseous fuel injection can be the corrected fuel injection parameter which is corrected first based on gaseous fuel fuelling values and then corrected a second time based on the engine speed and gaseous fuel rail pressure.

In another embodiment, the method can further comprise determining a second corrected fuel injection parameter. In this embodiment the method comprises accessing a second plurality of tables, each one of the plurality of tables being filled with correction data for the second corrected fuel injection parameter that is associated with a different predefined engine state wherein the correction data correlates to at least one of the corrected fuel injection parameter and one of the other data inputs; and retrieving a second correction factor from a selected one of the second plurality of tables that is associated with the engine state data input and calculating the second corrected fuel injection parameter. For example, the corrected fuel injection parameter can be gas rail pressure and the second corrected fuel injection parameter can be on-time for gaseous fuel injection.

For engines that use a pilot fuel to assist with ignition of the gaseous fuel, the corrected fuel injection parameter can be at least one pilot fuel injection parameter. For example, the at least one pilot fuel injection parameter can be at least one of pilot fuel rail pressure, pilot on-time and pilot fuel injection timing. The pilot on-time is determined based on a data input indicating a pilot fuel fuelling value that is corrected by retrieving correction factors based on measured pilot rail pressure values. The pilot fuel fuelling value can be corrected by a multiplication factor based on a measured engine coolant temperature. Finally, the pilot fuel injection timing is calculated depending on a pilot on-time and a separation time and taking in consideration a gaseous fuel injection timing.

DETAILED DESCRIPTION OF PREFERRED EMBODIMENT(S)

Figure 1:
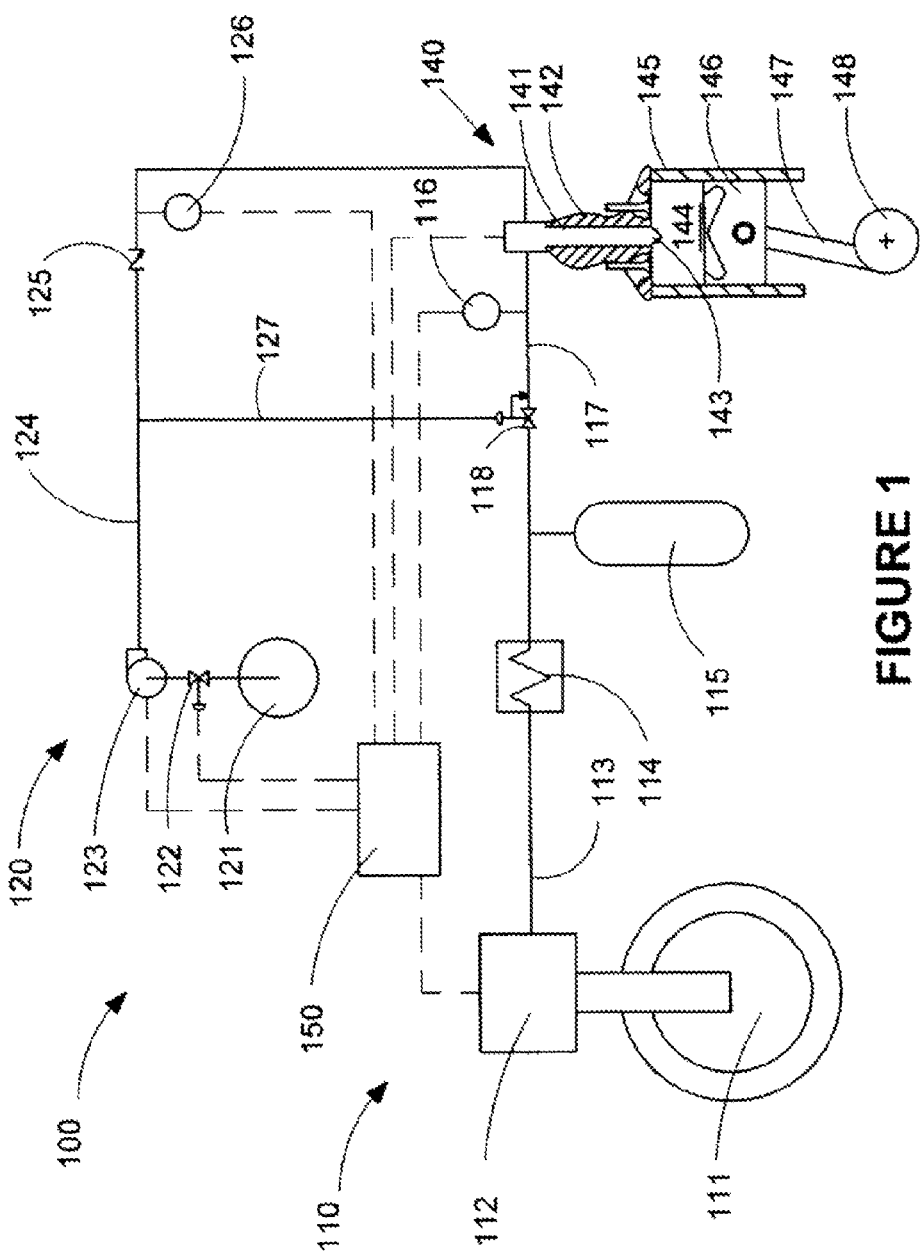
FIG. 1 is a schematic view of a direct injection gaseous-fuelled internal combustion engine system that can be used to practice the disclosed method. This system has a dual fuel injection valve which allows the separate and independent injection of a gaseous fuel and of a pilot fuel that is used to assist igniting the gaseous fuel.
Figure 2:
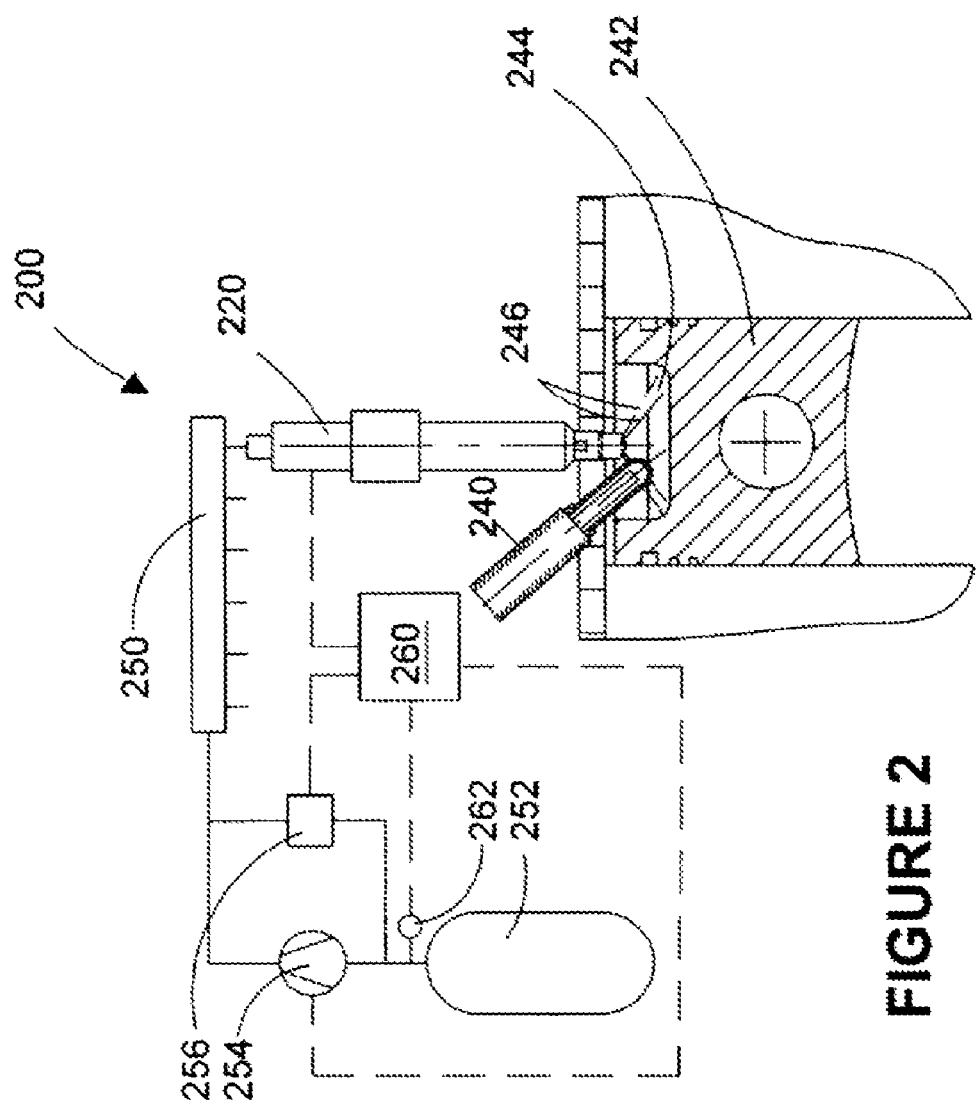
FIG. 2 is a schematic view of another example of a direct injection gaseous-fuelled internal combustion engine system that can be used to practice the disclosed method. This system uses a glow plug to assist with igniting the gaseous fuel.

FIGS. 1 and 2 show schematic views of two arrangements for injecting a gaseous fuel directly into the combustion chamber of an internal combustion engine. Herein "direct injection" is used to refer to the injection of fuel directly into the combustion chamber of an internal combustion engine, which is an approach that is technically distinct from engines that inject fuel into an engine's intake manifold or into the intake ports on the manifold side of the engine's intake valves. The schematic views shown in FIGS. 1 and 2 are not to scale, with some parts shown larger relative to the other parts to better illustrate their function.

Referring to FIG. 1, internal combustion engine system 100 shows an illustrative embodiment of a direct injection gaseous-fuelled engine that uses a pilot fuel to assist in igniting the gaseous fuel injected into a combustion chamber. In this example, the system stores the gaseous fuel as a liquefied gas in gas storage tank 111 and injects both the gaseous fuel and the pilot fuel directly into the combustion chamber through fuel injection valve 141. The manner in which the fuel is stored is not important for the disclosed method, and the fuel can be stored in a pressure vessel as a compressed gas, or for a stationary application the fuel can be delivered from a pipeline and compressed to the needed pressure.

Internal combustion engine system 100 generally comprises gaseous fuel delivery subsystem 110, pilot fuel delivery subsystem 120, fuel injection subsystem 140, and controller 150. Each of these subsystems is described in more detail below together with a description of the manner in which they cooperate with each other to introduce a gaseous fuel into a combustion chamber where it can be combusted.

Gaseous fuel delivery subsystem 110 comprises storage tank 111, pump 112, gas supply line 113, vaporizer 114, accumulator vessel 115, pressure sensor 116, gas rail 117, and pressure regulating valve 118. Gaseous fuels such as natural gas and hydrogen can be stored in liquefied form at cryogenic temperatures. Pump 112 can have a suction inlet disposed inside the cryogen space of storage tank 111, or, preferably, pump 112 can be immersed in the cryogen space, with a drive shaft extending therefrom and connected to a drive unit disposed outside the cryogen space.

Pilot fuel delivery subsystem 120 comprises storage tank 121, metering valve 122, pump 123, pilot fuel rail 124, check valve 125, pressure sensor 126, and pilot fuel line 127. In the illustrated embodiment, metering valve 122 controls pilot fuel pressure in pilot fuel rail 124 by controlling the quantity of pilot fuel that is delivered to pump 123, which in a preferred embodiment is a piston pump that is operative with variable fuel flow. Pilot fuel line 127 dead-ends at the control chamber of pressure regulating valve 118 thereby operating a valve member in pressure regulating valve 118 to control the fuel pressure in gaseous fuel rail 117 as a function of the pilot fuel pressure in pilot fuel rail 114. Through this arrangement gaseous fuel pressure is controlled through pilot fuel pressure. Pressure regulating valve 118 can be, for example, a dome-loaded regulator valve such as a piston or diaphragm operated pressure control valve that is set up to maintain a predetermined pressure differential that keeps the pressure in the pilot fuel rail higher than that in the gaseous fuel rail.

The engine system illustrated in FIG. 1 can further comprise additional equipment such as an exhaust gas after-treatment system for further controlling the vehicle emissions. Such an after-treatment system generally comprises a particulate filter (not illustrated) comprising carbon particles.

Referring to FIG. 2, internal combustion engine system 200 illustrates an embodiment of a direct injection gaseous-fuelled internal combustion engine system using a hot surface within the combustion chamber to assist in igniting the gaseous fuel injected directly therein. In combination with heat generated by the compression of the fuel charge during an engine cycle, a hot surface, such as the heated surface provided by glow plug 240 causes the gaseous fuel to ignite and propagate a flame throughout combustion chamber 244.

The system stores gaseous fuel in tank 252 and delivers it through fuel injection valve 220 into combustion chamber 244. The fuel is sprayed through the fuel injection ports of fuel injection valve 220, with reference number 246 indicating dashed lines which represent the outline of fuel sprays. The gaseous fuel is ignited with assistance from an ignition device such as glow plug 240. The respective tips of fuel injection valve 200 and glow plug 240 extend into combustion chamber 244. At least one fuel injection port of fuel injection valve 220 is oriented to direct one of the fuel sprays towards glow plug 240, which in the illustrated embodiment is inclined towards the nozzle of fuel injection valve 220.

A gaseous fuel rail pressure between 200 and 300 bar in common rail 250 has been found to be suitable for tested engines, but it is understood that different pressures could be employed. Controller 260 determines from pressure transducer 262 the pressure of the gaseous fuel supplied from tank 252 and considers the engine operating conditions when controlling compressor 254 and pressure control device 256 to supply the desired amount of gaseous fuel to the injection valve at the desired pressure, as further explained below.

Similar to an engine system that comprises a pilot fuel to assist with ignition of the gaseous fuel, as depicted in FIG. 1, the engine system illustrated in FIG. 2 can further comprise additional equipment such as an after-treatment system for further improving the vehicle emissions, including a particulate filter (not illustrated) comprising carbon particles.

Gaseous fuelled engines have to respond to different power and load requirements according to different conditions affecting the engine state, conditions that are either external (for example, cold temperatures, high or low transient loads) or internal to the engine system (for example, particulate filter regeneration mode, engine protection mode), while preserving or further lowering the vehicle's emissions rates. Therefore there is a need for both engine systems described above to be controlled according to the different engine states. Accordingly, several algorithms have been developed for controlling the engine fuelling strategies according to different engine states, as further detailed below. In a preferred embodiment, all of the algorithms described herein can be programmed into the control strategy that is followed by controller 150 or 260 (shown in FIGS. 1 and 2, respectively).

It is beneficial for the engine system to vary gas injection parameters as a function of engine speed and at least one parameter that is indicative of an engine operating condition such as the total fuelling amount. Other parameters indicative of the engine operating condition can be the engine load or torque, the throttle position or the intake manifold pressure. An example of a gas injection parameter is the gas injection pressure or the gas rail pressure. An algorithm for determining the target gas rail pressure based on engine speed and total fuelling is illustrated in FIG. 3.

In the case of a direct injection engine using a pilot fuel, such as the one illustrated in FIG. 1, the pilot fuel rail pressure is controlled first, by operation of metering valve 122, and the gas rail pressure is maintained approximately 7 bar below the pilot rail pressure through pressure regulating valve 118. In preferred embodiments, there are no electronic controls associated with pressure regulating valve 118. The regulation of the gas rail pressure is determined by the construction of pressure regulating valve 118, which can employ a spring in the control chamber of valve 118 to give the gaseous fuel pressure a negative bias.

Figure 3:
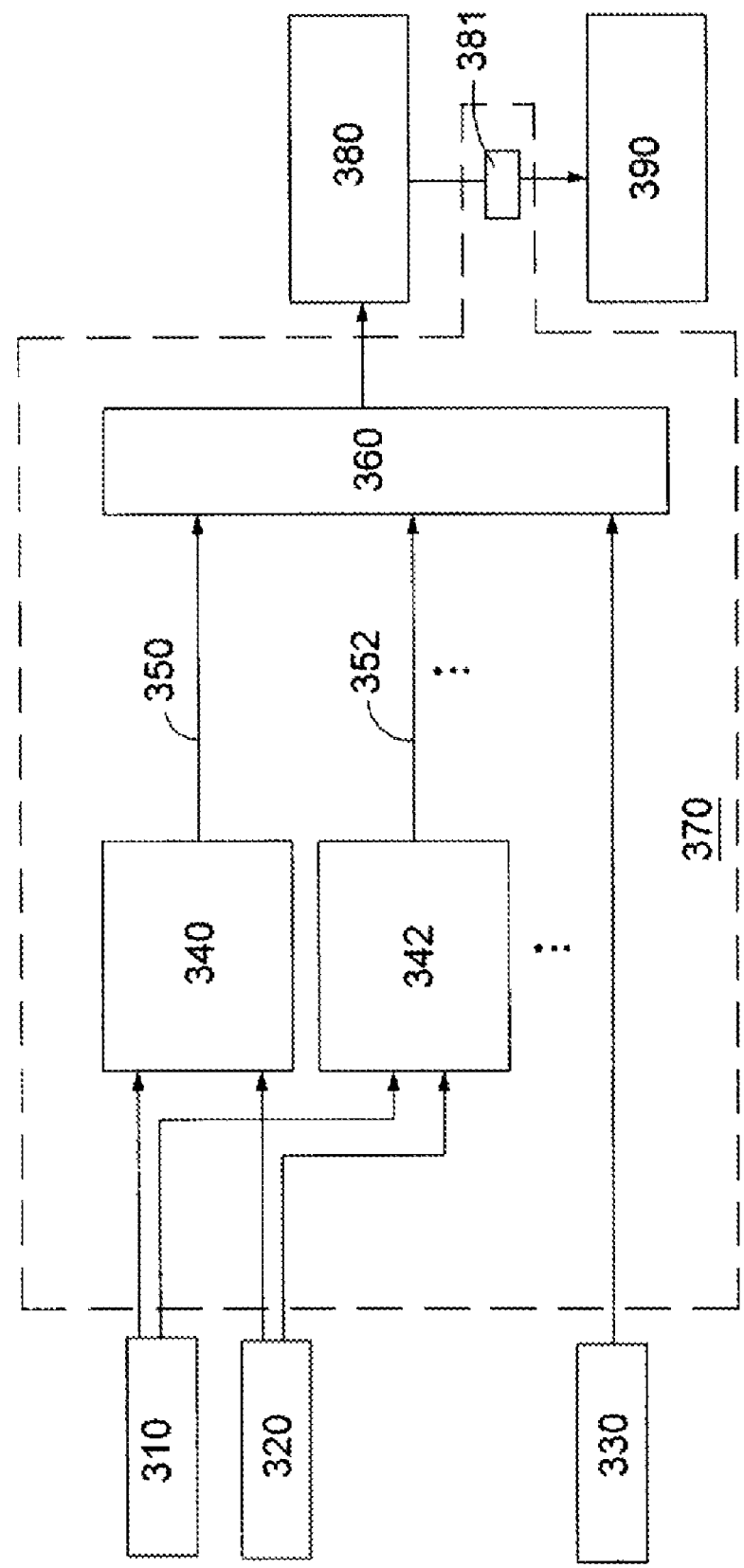
FIG. 3 is a flow diagram of an algorithm that can be employed by the disclosed method for controlling the respective pressures of a gaseous fuel and a pilot fuel that are each injected directly into the combustion chamber of an internal combustion engine, which uses the pilot fuel to assist with ignition of the gaseous fuel, with the respective pressures determined based on a parameter indicative of the engine state.

With reference to FIG. 3, box 310 represents the input of the total fuelling amount or another parameter indicative of the engine operating condition (engine load or torque, throttle position or intake manifold pressure are examples of other parameters that can be used). Box 320 represents the input of the measured engine speed and box 330 represents the input of engine state information, collected from the vehicle control system. Controller 370 receives the data inputs and can access look-up tables that store data in memory, with the stored data associated with different engine states. The look-up tables correlate the engine speed and the total fuelling amount (or another predefined parameter indicative of the engine operating condition). With reference to the data stored in the look up tables, controller 370 can determine a data output, which in this example is the target pressure for the pilot fuel rail, that has been adjusted to reflect the data inputs. By way of example, look-up table 340 can be filled with output data that gives values for the target pressure for the pilot fuel rail when the particulate filter in the engine's exhaust pipe needs to be regenerated and thereby cleaned. For this example, data output 350, which is determined from look-up table 340, can be lower than the baseline target pressure for the pilot fuel rail in normal operating conditions to increase the temperature of the exhaust gases that is commanded in the regeneration mode because a predetermined higher exhaust gas temperature is needed to regenerate the particulate filter. In another example, look-up table 342 stores output data from which controller 370 picks data output 352 that can be used to adjust the target pressure for the pilot fuel rail when the engine is running in an engine protection mode, such as when there is no exhaust gas recirculation in the engine system. Lookup tables 340 and 342 are shown to illustrate the disclosed method and it is understood that more look-up tables (not illustrated) can be stored in memory where they are accessible by controller 370 to retrieve adjusted values that correct for different predefined engine states, for example, when the engine is operating in a normal operation mode, running at high or low transient loads, or when the engine is operating at different altitudes.

Output data 350 and 352, and if more look-up tables are employed, additional output data associated with other engine states are all inputted into switch 360 together with engine state information input from box 330. A target pressure for the pilot fuel rail is selected and determined in box 380 based on the engine state information input from box 330. That is, if the engine state information indicates that the engine is in a regeneration mode for the particulate filter, then in this example, switch 360 is commanded to select data output 350 to send to output box 380, this being the data output from look-up table 340, which was the look-up table that adjusted for the filter regeneration engine state.

Alternatively, controller 370 can select to compute only the output data 350 if, for example, a filter regeneration mode is the engine state information communicated to controller 370 through input 330. Controller 370 will skip the computation associated with all the other engine states (for example, output 352). In this case, output 352, for example, will hold the value from a previous computation, but the value in the output box 380 would not be affected because output 350 is the one selected by switch 360. Switch 360 will be also performing the selection of values during the switching from one engine state to another or during the transition mode from one engine state to another.

Target pressure for the pilot fuel rail is a less significant factor for a gaseous-fuelled internal combustion engine. Gaseous fuel injection pressure and, implicitly, gas rail pressure is by far a more important factor, especially when correlated with the on-time of the gaseous fuel, determined as described further in relation with FIG. 5, in further reducing emissions and having a faster and more stable combustion. Using the selected target pressure for the pilot fuel rail, calculator component 381 of controller 370 calculates the target pressure for the gaseous fuel rail, which is the data shown in output box 390. In tested engines, a pressure difference of approximately 7 bar between the target pilot fuel and gaseous fuel pressures was found to be suitable.

The target pressure for the gaseous fuel rail can be lower than a baseline determined for a normal operation mode. For example, in a high transient load mode the target injection pressure of the gaseous fuel needs to be lower than the baseline to further reduce emissions.

Metering valve 122 of the engine system depicted in FIG. 1 regulates the pilot fuel pressure in pilot fuel rail 124 to the selected target pressure for the pilot fuel rail determined in data output box 380 of FIG. 3, and pressure regulating valve 118 regulates the pressure in gaseous fuel rail 117 to the selected target pressure determined in data output box 390. The function of controller 150 in FIG. 1 is performed by controller 370 in the embodiment shown in FIG. 3.

Figure 4:
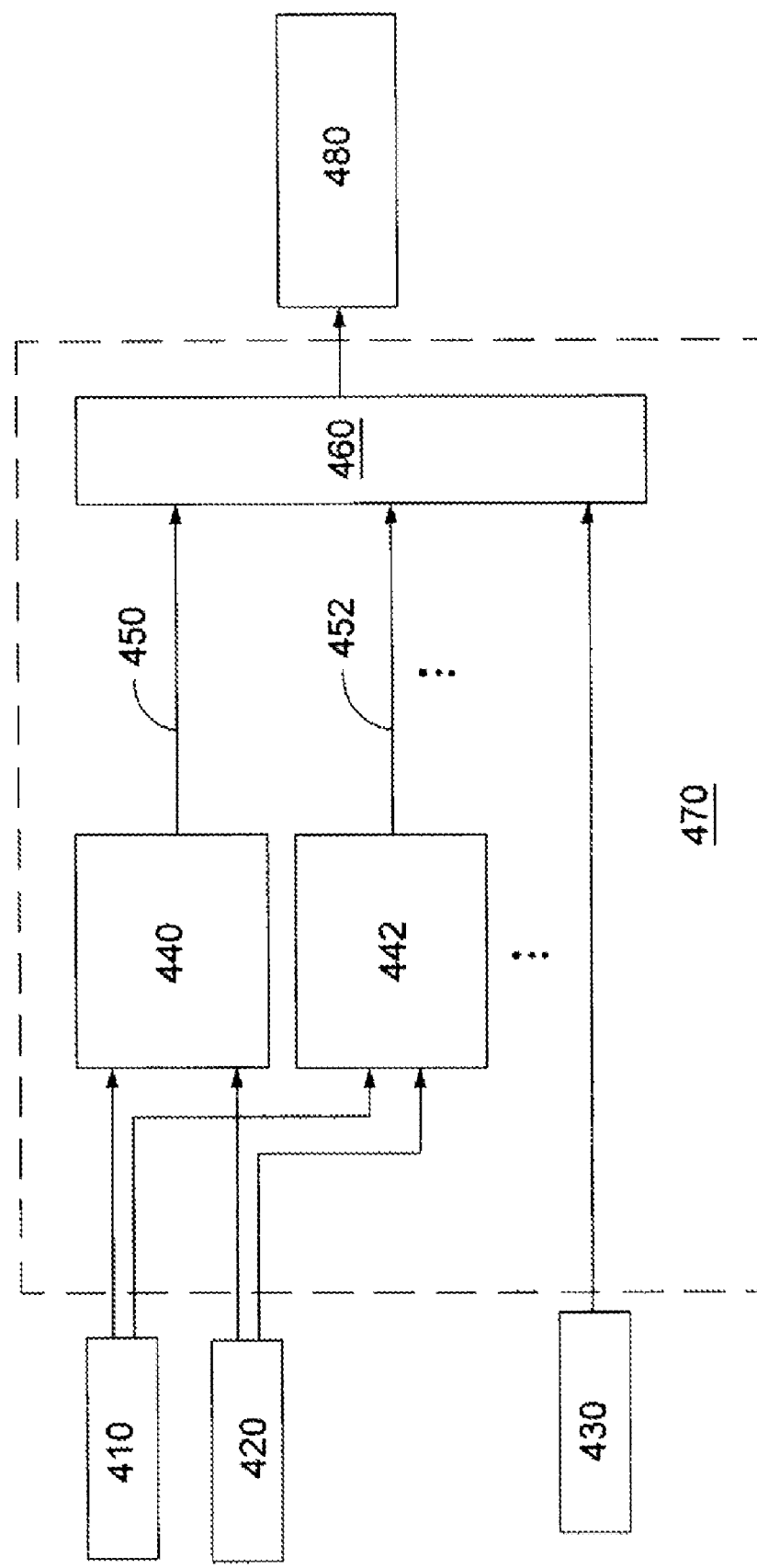
FIG. 4 is a flow diagram of an algorithm that can be employed by the disclosed method for controlling the pressure of a gaseous fuel that is injected directly into the combustion chamber of an internal combustion engine, which employs a glow plug as an ignition assisting device to ignite the gaseous fuel, with gaseous fuel pressure determined based on a parameter indicative of the engine state.

FIG. 4 illustrates an algorithm similar to the one shown in FIG. 3 except that instead of using a pilot fuel to assist with ignition of the gaseous fuel, this function is accomplished with an ignition assisting device, such as the glow plug shown in FIG. 2. No pilot fuel is needed in this case, but FIG. 4 shows that the same method can still be employed to compensate for changes in the engine state. Data output 450 is the target pressure for the gaseous fuel rail that is retrieved from look-up table 440 based on total fuelling amount data input 410 and engine speed data input 420. Like in the embodiment of FIG. 3, a plurality of look-up tables can be filled with output data corresponding to different predefined engine states. For example, look-up table 440 can be filled with data that corresponds to a particulate filter regeneration mode and based on total fuelling data input 410 and engine speed data input 420, output data 450 can be retrieved from look-up table 440. Similarly, look-up table 442 can be filled with data that corresponds to when the engine runs in an engine protection mode, with no exhaust gas recirculation, and output data 452 is the target pressure for the gaseous fuel rail retrieved from look-up table 442 based on total fuelling data input 410 and engine speed data input 420. The different target pressures defined in this example as data outputs 450 and 452 are inputted into switch 460 which selects a target pressure for the gaseous fuel, which is shown in FIG. 4 as the data output in box 480, which is selected based on engine state information 430, which is also inputted into switch 460. Controller 470 commands the pressure control device to regulate the pressure in the common rail to the selected target pressure output in box 480. In FIG. 4, controller 470 performs the function of controller 260 in FIG. 2. The algorithm illustrated in FIG. 4 can be used with any other gaseous-fuelled internal combustion engine where no ignition assisting device is needed.

As described above in relation to FIG. 3, the controller can select to compute only one output data that is inputted into the switch according to the engine state communicated to the controller through the engine state information input. Consequently, the controller will skip the computation associated with all the other engine states, the outputs corresponding to those engines holding a value corresponding to a previous computation without affecting the value in the output box 480. The switch will be also performing the selection of values during the switching from one engine state to another or during the transition mode from one engine state to another.

Target gas rail pressures 390, 480 correlate directly to the gas injection pressures at which a gaseous fuel is injected into the combustion chamber of a direct injection gaseous-fuelled internal combustion engine and represent one of parameters defining the gaseous fuel injection process.

It is beneficial for the operation of the engine system, as mentioned above, to control the gas injection parameters according to the engine state. Another parameter defining the gaseous fuel injection process is the fuelling amount. When an engine is fuelled with gaseous fuel alone the gaseous fuel fuelling amount is equal to the total fuelling amount, and can be referred to simply as the fuelling amount. When an engine is fuelled with a gaseous fuel and a pilot fuel, the total fuelling amount is the sum of the gaseous fuel fuelling amount and the pilot fuelling amount, because while the main purpose of the pilot fuel is to ignite the gaseous fuel, it still contributes energy that is accounted for in addressing the total energy requirement met by the total fuelling amount. Based on the required fuelling amount the injection on-time is determined. "On-time" is defined as the amount of time the gaseous fuel injection valve (valve 141 in FIG. 1 or valve 220 in FIG. 2) is activated to an open position for injecting the desired amount of gaseous fuel into the combustion chamber.

"Pilot on-time" is defined as the amount of time the pilot fuel injection valve is activated to an open position for engine systems that use a pilot fuel to assist with ignition of the gaseous fuel.

Figure 5:
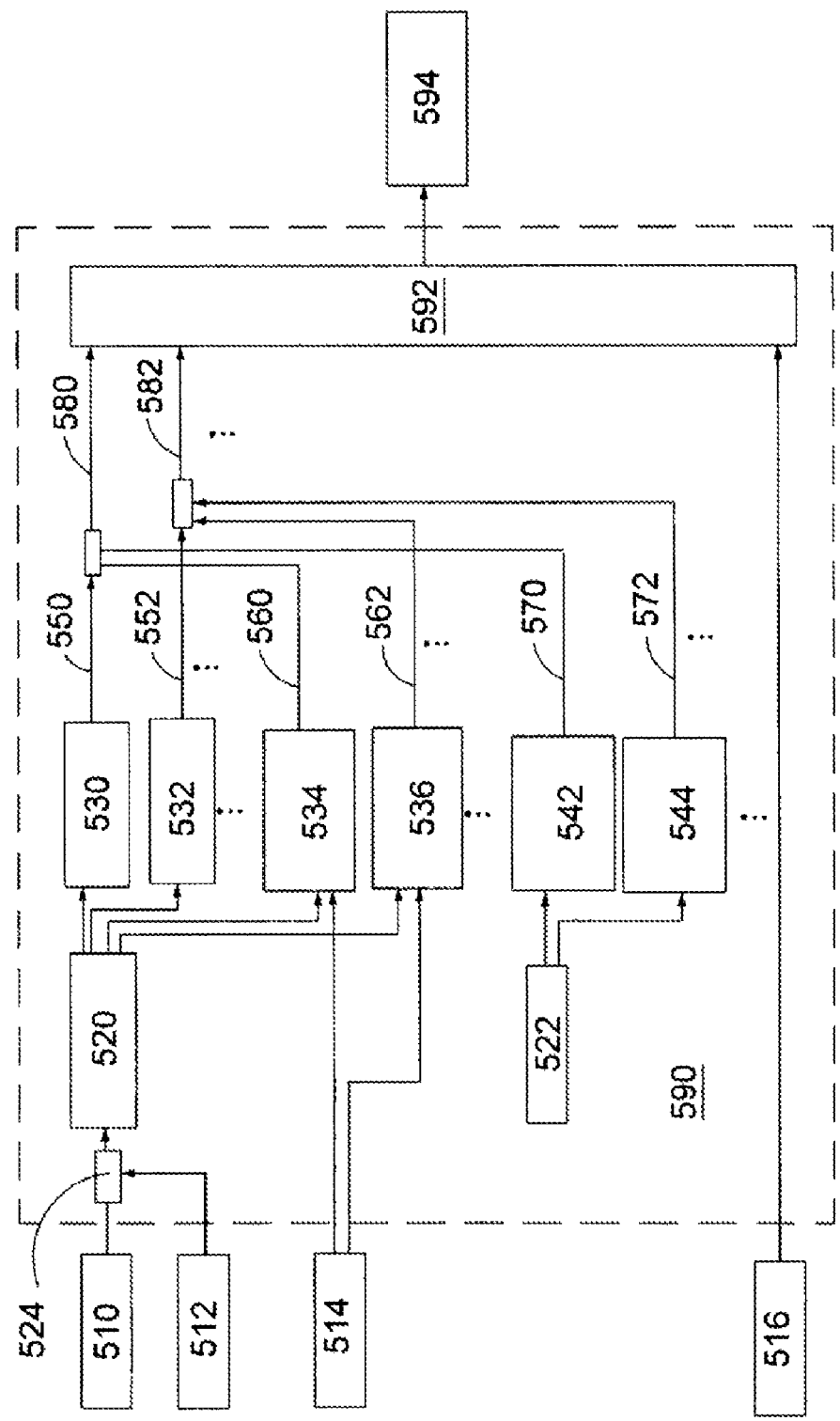
FIG. 5 is a flow diagram of an algorithm that can be employed for controlling the injection of gaseous fuel into an internal combustion engine, by determining gaseous fuel injection on-time based on a parameter indicative of the engine state.

An algorithm for controlling the on-time for a direct injection gaseous fuelled internal combustion engine is illustrated in FIG. 5. Gaseous fuel is injected in the combustion chamber of an internal combustion at a pressure slightly higher than the in-cylinder pressure. While the pressure of the gaseous fuel rail remains generally constant once determined by the algorithm illustrated in FIG. 3 or 4, the in-cylinder pressure varies independent of the fuel injection system. Therefore, the amount of time the gaseous fuel injection valve is activated to an open position, respectively the on-time, is an important parameter for compensating the variations of the in-cylinder pressure and making sure that the desired amount of gaseous fuel is injected into the combustion chamber. Generally, direct injection gaseous-fuelled engine systems are diesel engine systems redesigned to operate with gaseous fuels. Therefore, as a starting point controller 590 can calculate gaseous fuel fuelling amount 520 from total fuelling amount 510, using calculator 524 and applying lower energy correction factor 512. Total fuelling amount 510 is the diesel fuelling amount required for engine operation in a predefined baseline condition. Lower energy correction factor 512 takes into consideration the energy content difference between diesel and the particular gaseous fuel. If the engine uses pilot injection for assisting in igniting the gaseous fuel, as illustrated in FIG. 1, the pilot fuelling amount is subtracted from the total fuelling amount when calculating the gaseous fuel fuelling amount. In another embodiment, the gaseous fuel fuelling amounts can all be predetermined, obviating the need for steps 512 and 524, and the algorithm can start from step 520 with the inputted gaseous fuel fuelling amount received by controller 590.

By way of example, when the engine operates in a particulate filter regeneration mode, on-time 550 is determined based on the gaseous fuel fuelling amount 520 from a two-dimensional look-up table 530 that corresponds to the filter regeneration mode signaled to controller 590 through engine state information 516 inputted into controller 590. A different on-time 552 can be obtained from look-up table 532 corresponding to when the engine is in a different engine state, such as an engine protection mode. The series of dots below look-up table 532 indicates that other look-up tables corresponding to other engine states can be added in accordance with the disclosed method.

In this example, values for on-times 550 and 552 are corrected by applying a correction factor dependent on the engine speed and the gas fuelling amount. Gas correction factor 560, for the filter regeneration mode, is obtained from look-up table 534 that correlates gaseous fuel fuelling amount 520 and engine speed 514. Similarly, lookup table 536 stores correction factor data associated with the engine protection mode from which on-time correction factor 562 can be retrieved as a function of gaseous fuel fuelling amount 520 and engine speed 514.

The target pressure for the gaseous fuel rail that was set in one of the previously described algorithms in either one of FIG. 3 or 4 can also be employed in the algorithm of FIG. 5 to determine a correction factor for the on-time. For example, at box 522 the target pressure for the gaseous fuel rail 522 is inputted and then controller 590 accesses look-up table 542 to retrieve correction factor 570, that is applied to gas on-time 550 along with correction factor 560. Similarly, for different engine states, target pressure 522 for the gaseous fuel rail can be inputted into other look-up tables associated with that engine state to retrieve other correction factors that are determined by that engine state. Continuing with the example shown in FIG. 5, target pressure 522 is inputted into a look-up table 544, which is filled with correction data for the engine protection mode and controller 590 retrieves correction factor 572, which is applied to on-time 552. Note that look-up tables 530, 534, and 542 are all filled with correction data associated with when the engine is in a particulate filter regeneration mode and look-up tables 532, 536 and 544 are all filled with correction data associated with when the engine is in an engine protection mode.

On-time values 580 and 582 have been twice corrected at two respective stages as shown by the algorithm illustrated in FIG. 5. On-time values 580 and 582 are inputted into switch 592 and controller 590 is programmed to output selected on-time value 594 based on the matching engine state information 516 also inputted into switch 592. That is, if engine state information 516 indicates that the engine is in a particulate filter regeneration mode, then selected on-time value 594 is equal to corrected on-time value 580, and if engine state information 516 indicates that the engine is in an engine protection mode, then selected on-time value 594 is equal to corrected on-time value 582. There can be many different predefined engine states, and associated look-up tables with correction values that can be applied to determine the corrected on-time value for a particular engine state. For example, other engine states can correspond to when the engine is operating in a normal operation mode, when it is running at high or low transient loads, or when the engine is operating at different altitudes.

As described above, the controller can select to compute only one output data that is inputted into the switch according to the engine state communicated to the controller through the engine state information input. Consequently, the controller will skip the computation associated with all the other engine states, the outputs corresponding to those engines holding a value corresponding to a previous computation without affecting the value in the output box 594. The switch will be also performing the selection of values during the switching from one engine state to another or during the transition mode from one engine state to another.

The amount of gaseous fuel that is injected into a combustion chamber can be dependent upon more variables than just the on-time. Some fuel injection valves allow some control over the amplitude of the valve member displacement, sometimes referred to as the "lift", when referring to needle or poppet fuel injection valves. Some fuel injection valves can also be operated quickly enough to allow more than one injection pulse per cylinder for each engine cycle. For example, injection valves that are directly actuated by a piezoelectric or magnetostrictive actuator can be employed with "shaped" amplitudes that can be changed over the course of an injection event and with sufficient speed to allow multiple injection pulses. U.S. Pat. No. 7,040,281, assigned to the same assignee and incorporated herein by reference in its entirety discloses an example of a valve that be actuated with amplitude control and with sufficient speed to permit multiple injection pulses. With the present method, the engine operating modes can correspond to the different engine states inputted into controller 590 and therefore different gas injection pulse widths and amplitudes can be selected from look-up tables (not illustrated) to command the number of injection pulses, the pulse width and amplitude of each gaseous fuel injection pulse based on engine speed 514 and total fuelling amount 510.

Another gaseous fuel injection parameter is the gaseous fuel injection timing. The gaseous fuel injection timing can be controlled by the engine controller system which can use the same injection timing values for the gaseous fuelled engine as the ones used for a conventional diesel engine. Alternatively, in other situations, for example in the cold start mode, when the engine is starting at very low temperatures, the gaseous fuel injection timing can be controlled to be in advance of the injection timing of the gaseous fuel for the normal operation mode.

Gaseous fuel injection timing can be controlled based on the engine condition or to alleviate the problems associated with the engine operation, for example when starting in very low temperature conditions this can be detected by measuring the engine coolant temperature. The gaseous fuel injection timing can be advanced from the otherwise determined fuel injection timing by an amount of time that depends on the measured coolant temperature. The value of the advance time is determined from a look-up table (not illustrated) based on the measured coolant temperature.

When a direct injection internal combustion engine uses a pilot fuel to assist with igniting the gaseous fuel as in the embodiment shown in FIG. 1, it is beneficial to engine operation to vary the pilot fuelling amount as a function of engine speed and another parameter indicative of the engine operating condition such as the total fuelling amount.

Figure 6:
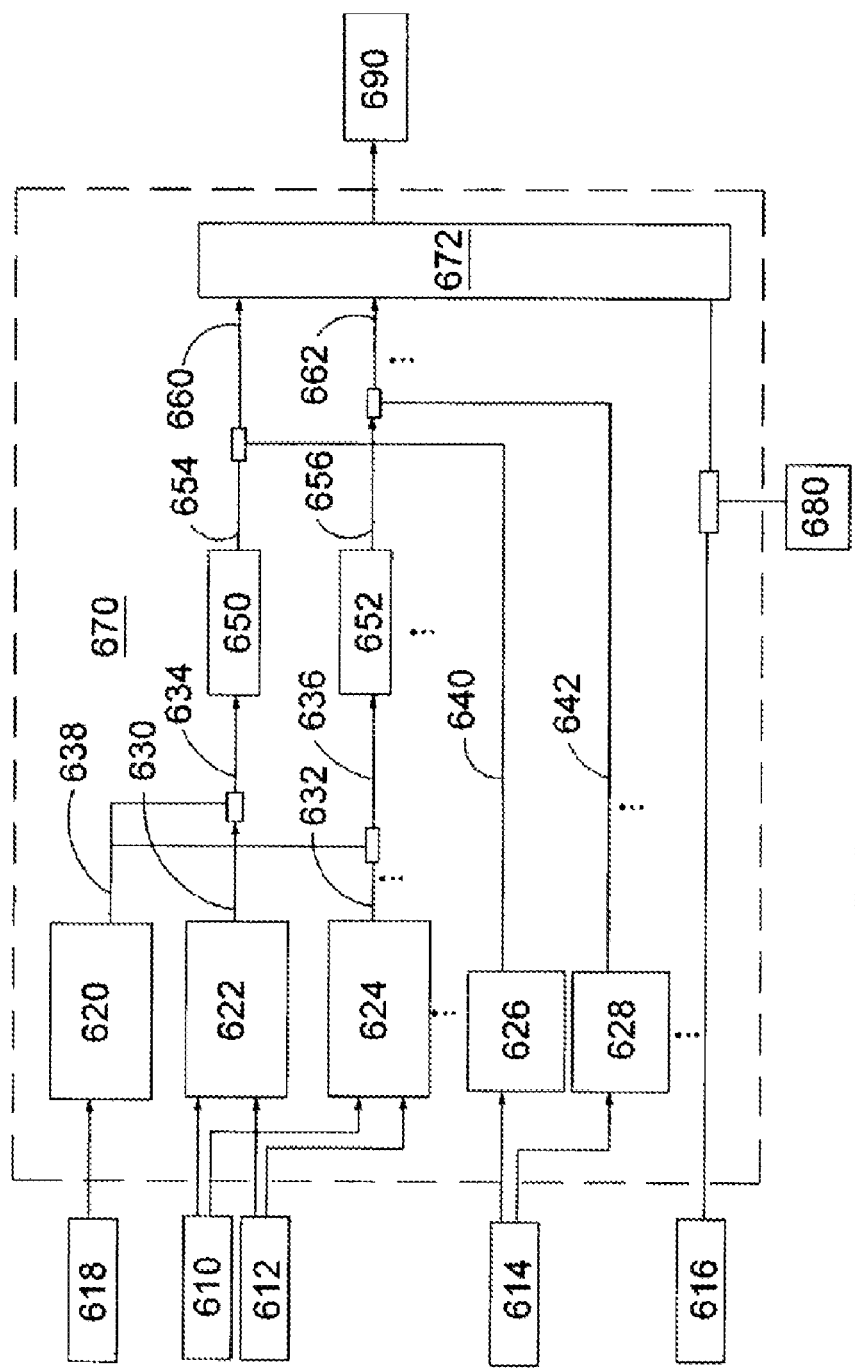
FIG. 6 is a flow diagram of an algorithm that can be employed for controlling the pilot fuel injection on-time for a gaseous-fuelled internal combustion engine, by determining pilot fuel injection on-time based on a parameter indicative of the engine state.

Based on the required pilot fuelling amount the pilot on-time is determined. An algorithm for controlling the pilot on-time for a direct injection gaseous fuelled internal combustion engine is illustrated in FIG. 6. Like in the other examples, particulate filter regeneration and engine protection mode are used as examples of engine states that can be associated with certain correction factors, but many different engine states can be corrected for by incorporating more look-up tables as illustrated by the different engine states discussed with reference to FIG. 6 and the series of dots underneath the steps shown therein.

With reference now to FIG. 6, when the engine is in a particulate filter regeneration mode, from data inputs of engine speed 610 and total fuelling amount 612, pilot fuelling amount 630 can be determined from look-up table 622. When the engine is in an engine protection mode, look-up table 624 can be accessed to retrieve adjusted pilot fuelling amount 632 based on engine speed 610 and total fuelling amount 612.

When the engine starts in very low temperature conditions the low intake manifold temperature and low engine coolant temperature can result in insufficiently high compression temperature during the gaseous fuel injection event to assure complete combustion during start-up and warm-up of the engine. The cold start problem can be alleviated in different ways, one being increasing the pilot amount injected into the combustion chamber. The cold start state is detected based on engine coolant temperature data 618 which is inputted into controller 670. Controller 670 accesses multiplication table 620 to determine multiplication factor 638 from the received engine coolant temperature data 618. Multiplication factor 638 is applied to pilot fuelling amounts 630 and 632 as shown in FIG. 6, whereby corrected pilot fuelling amounts 634 and 636 calculated for the respective engine states.

In another approach, the cold start problem can be alleviated by increasing the value of the total fuelling amount inputted to the controller 670 by a multiplication factor that depends on the engine coolant temperature. Controller 670 accesses a multiplication table (not illustrated) to determine the multiplication factor for the total fuelling amount from the received engine coolant temperature data 618. In this case, the corrected value of the total fuelling amount is further inputted into look-up tables 622 and 624, for example, and the algorithm proceeds to the next steps as further described below and illustrated in FIG. 6.

Corrected pilot fuelling amount 634 determines the amount of pilot fuel that is to be injected and to calculate the pilot on-time, corrected pilot fuelling amount 634 is inputted into two-dimensional pilot on-time table 650. Pilot on-time 654 for the particulate filter regeneration engine mode is output from table 650. Because pilot fuel amounts are relatively small compared to the total fuelling amount, a constant amplitude is typically commanded for the pilot fuel injection pulse so the calculation of the pilot on-time from the corrected pilot fuelling amount 634 is relatively straightforward. The same calculation of the pilot on-time is shown for other engine states, as shown by pilot on-time table 652 and calculated pilot on-time 656 for the engine protection mode.

In a preferred embodiment, the algorithm shown in FIG. 6 takes into account that the pilot fuel rail pressure affects the final value of the pilot on-time based on the fact that the pilot fuel flow rate is dependent on the pilot fuel rail pressure. Consequently, correction factor 640 for the particulate filter regeneration mode, for example, is determined from look-up table 626 that correlates the correction factor with the measured pilot rail pressure 614. In another example, a correction factor 642 for an engine protection mode, for example, is determined from look-up table 628 based on the measured pilot rail pressure 614. Correction factors 640 and 642 are applied as a second correction to pilot on-times 654 and 656 respectively, to output corrected pilot on-times 660 and 662, which are sent to switch 672. Measured values of the pressure in the pilot fuel rail can be detected, for example, by pressure sensor 126 illustrated in FIG. 1.

Like in the other embodiments, based on engine state information 616 which is also inputted into switch 672, controller 670 determines selected pilot on-time 690, which corresponds to the pilot on-time that is associated with the same engine state 616 that is input into switch 672. With reference to FIG. 1, based on selected pilot on-time 690, valve 141 is activated to inject the desired amount of pilot fuel into combustion chamber 144. The controller's memory can store many more look-up tables (not illustrated) as indicated by the series of dots under the look-up tables and other correction steps, with each look-up table associated with different engine states, for example, when the engine is operating in a normal operation mode, running at high or low transient loads, or when the engine is operating at different altitudes.

As described above, the controller can select to compute only one output data that is inputted into the switch according to the engine state communicated to the controller through the engine state information input. Consequently, the controller will skip the computation associated with all the other engine states, the outputs corresponding to those engines holding a value corresponding to a previous computation without affecting the value in the output box 690. The switch will be also performing the selection of values during the switching from one engine state to another or during the transition mode from one engine state to another.

Yet another engine state that can be communicated to the controller is the "run-on-pilot" state. There are situations when the gaseous fuel pressure in accumulator 115, illustrated in FIG. 1, drops too low to inject the desired amount of gaseous fuel to start the engine or when pump 112 is unable to deliver gaseous fuel at adequate pressures to gas rail 117. When such a situation is signaled to controller 670 by the sensors in the engine system, the engine can be fuelled with pilot fuel only. However, an engine operating in this mode cannot run at full power because the pilot fuel injection valve is not sized to permit the mass flow rate through the valve that would be needed for useful operation at full power. This mode is only useful for allowing a vehicle to move to a safe place where it can be stopped, or for other situations like moving an unloaded vehicle to a refueling station so its fuel tanks for storing gaseous fuel can be re-filled. In the embodiment shown in FIG. 6, command 680 is inputted into controller 670 when the "run-on-pilot" mode is needed, and when command 680 is received by controller 670, it is programmed to override engine state information 616 and the selected pilot on-time 690, and a separate look-up table (not illustrated) that receives as inputs the total fuelling amount and the engine speed, is used to determine a pilot fuelling amount and a pilot on-time that corresponds to this "run-on-pilot" engine state. Such a look-up table is part of the look-up tables stored in the memory of controller 670 or in external memory that is accessible to controller 670. Correction factors can be applied by going through similar steps as illustrated in the other algorithms except that when the engine is commanded to run in the "run-on-pilot" mode the gas on-time is set to zero. In another embodiment, the "run-on-pilot" state could be one of the detectable engine states communicated to controller 670 within engine state information 616.

Figure 7:
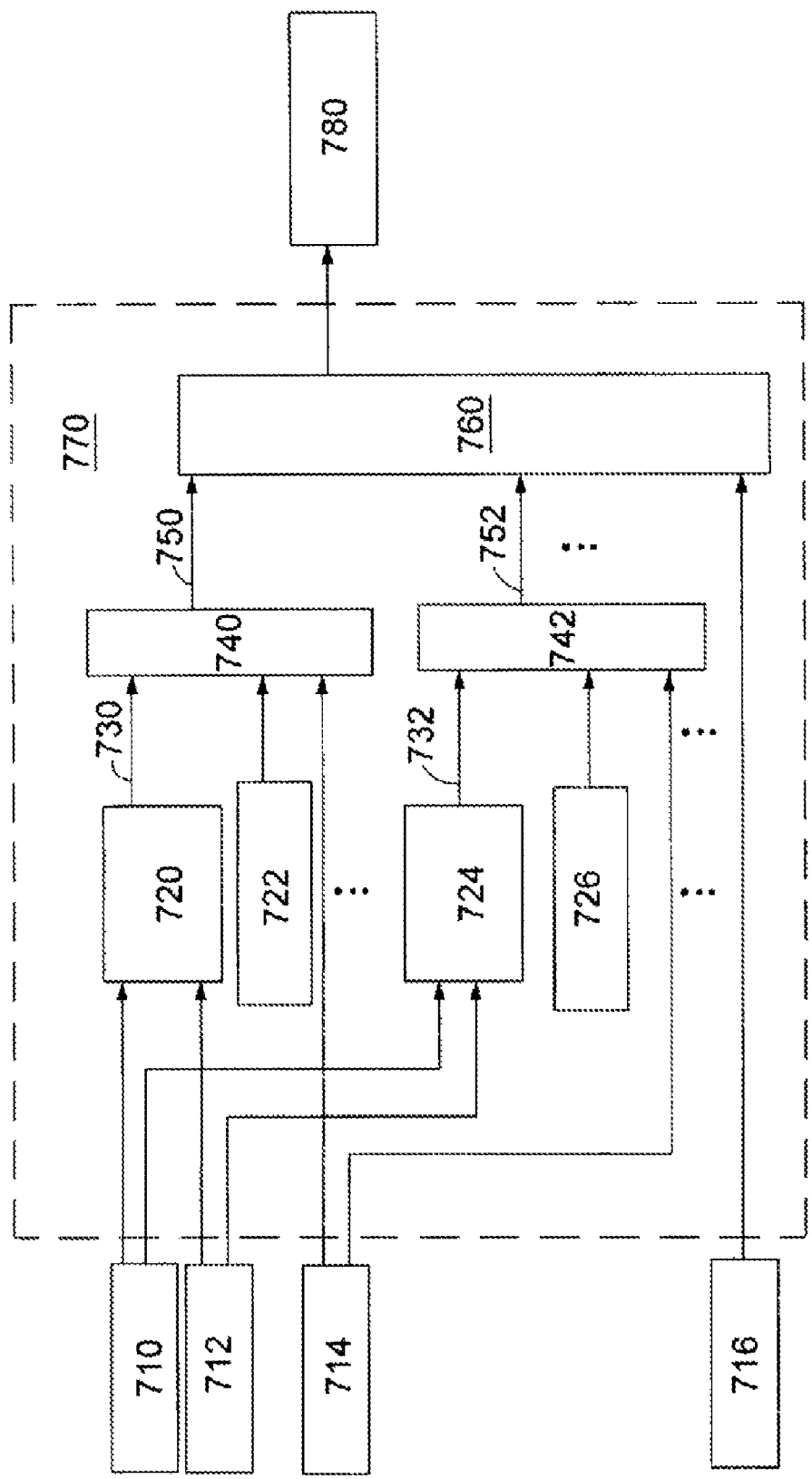
FIG. 7 is a flow diagram of an algorithm that can be employed for controlling the timing for pilot fuel injection for a gaseous-fuelled internal combustion engine, by determining such timing based on a parameter indicative of the engine state.

When a direct injection internal combustion engine uses a pilot fuel for assisting in igniting a gaseous fuel as detailed in FIG. 1, it is beneficial for engine operation to also vary the pilot injection timing as a function of the engine speed and another parameter indicative of the engine operating condition such as the total fuelling amount. FIG. 7 shows an algorithm for controlling pilot injection timing for a direct injection gaseous fuelled internal combustion engine.

In preferred embodiments, pilot fuel injection timing is based on the gaseous fuel injection timing, which is employed to set a base point for each engine cycle. The gaseous fuel injection timing can be controlled by the vehicle control system which uses the same injection timing values for the gaseous fuelled engine as the ones used for the diesel engine systems, or it can be controlled based on the engine condition, for example when operating in the cold start mode described above.

With reference now to FIG. 7, the separation time between the pilot fuel injection timing and the gaseous fuel injection timing is determined based on the engine speed and another parameter indicative of the engine operating condition, such as total fuelling amount. Other parameters indicative of the engine operating condition can be the engine load or torque, the throttle position or the intake manifold pressure. In the illustrated algorithm, data inputs engine speed 710 and total fuelling amount 712 are received by controller 770 to begin the determination of separation time 730 by referring to look-up 720, which is filled with data for determining separation time 730 when the engine state is in a particulate filter regeneration mode. Data input 722 is the corrected pilot on-time for the particulate filter regeneration mode, which can be determined by the algorithm illustrated in FIG. 6 (where this data is designated by reference number 660). Determined separation time 730, corrected pilot on-time 722, and gaseous fuel injection timing 714, are the basis for controller 770 determining pilot injection timing 750 when the engine is in a filter regeneration mode, using predefined calculator 740. That is, for this engine state, the timing for pilot fuel injection is in advance of the timing of the gaseous fuel start-of-injection point by an amount of time equal to the sum of separation time 730 and corrected pilot on-time 722. Similarly, for other engine states, such as the engine protection mode, pilot injection timing 752 is calculated within calculator 742, to be in advance of the timing of the gaseous fuel start-of-injection point 714 by an amount of time represented by the sum of separation time 732 and corrected pilot on-time 726, wherein separation time 732 is determined by controller 770 referring to look-up table 724.

The controller's memory or external memory accessible by the controller can store more look-up tables (not illustrated) corresponding to different other states of the engine, for example, when the engine is operating in a normal operation mode, running at high or low transient loads, or when the engine is operating at different altitudes.

Like in the other embodiments, pilot injection timing values 750, 752, and other pilot injection timing values when more engine states are accounted for, can all be inputted together to switch 760 along with engine state information 716. Controller 770 then determines selected pilot injection timing 780 based on the value associated with communicated engine state information 716 and selected pilot injection timing 780 is outputted to the engine fuelling system. With reference to FIG. 1, controller 150, which performs the function of controller 770 in FIG. 7, commands valve 141 to start injecting pilot fuel into combustion chamber 144 at selected pilot fuel injection timing 780.

As described above, the controller can select to compute only one output data that is inputted into the switch according to the engine state communicated to the controller through the engine state information input. Consequently, the controller will skip the computation associated with all the other engine states, the outputs corresponding to those engines holding a value corresponding to a previous computation without affecting the value in the output box 780. The switch will be also performing the selection of values during the switching from one engine state to another or during the transition mode from one engine state to another.

In preferred embodiments, as described above, more than one of the algorithms described in FIGS. 3-7 can be incorporated into the control strategy that is performed by the same controller, and this controller can be the one which is illustrated in FIG. 1 as controller 150, or in FIG. 2 as controller 260. However, the algorithms shown in FIG. 3, 6 or 7 would not be used by a controller for the system shown in FIG. 2 because that system does not use pilot fuel.

In preferred embodiments the look-up tables are stored in the controller's memory or in memory accessible to the controller, and the data in the look-up tables is empirically derived obtained by testing the engine to achieve optimized emission levels for all engine states.

Figure 8:
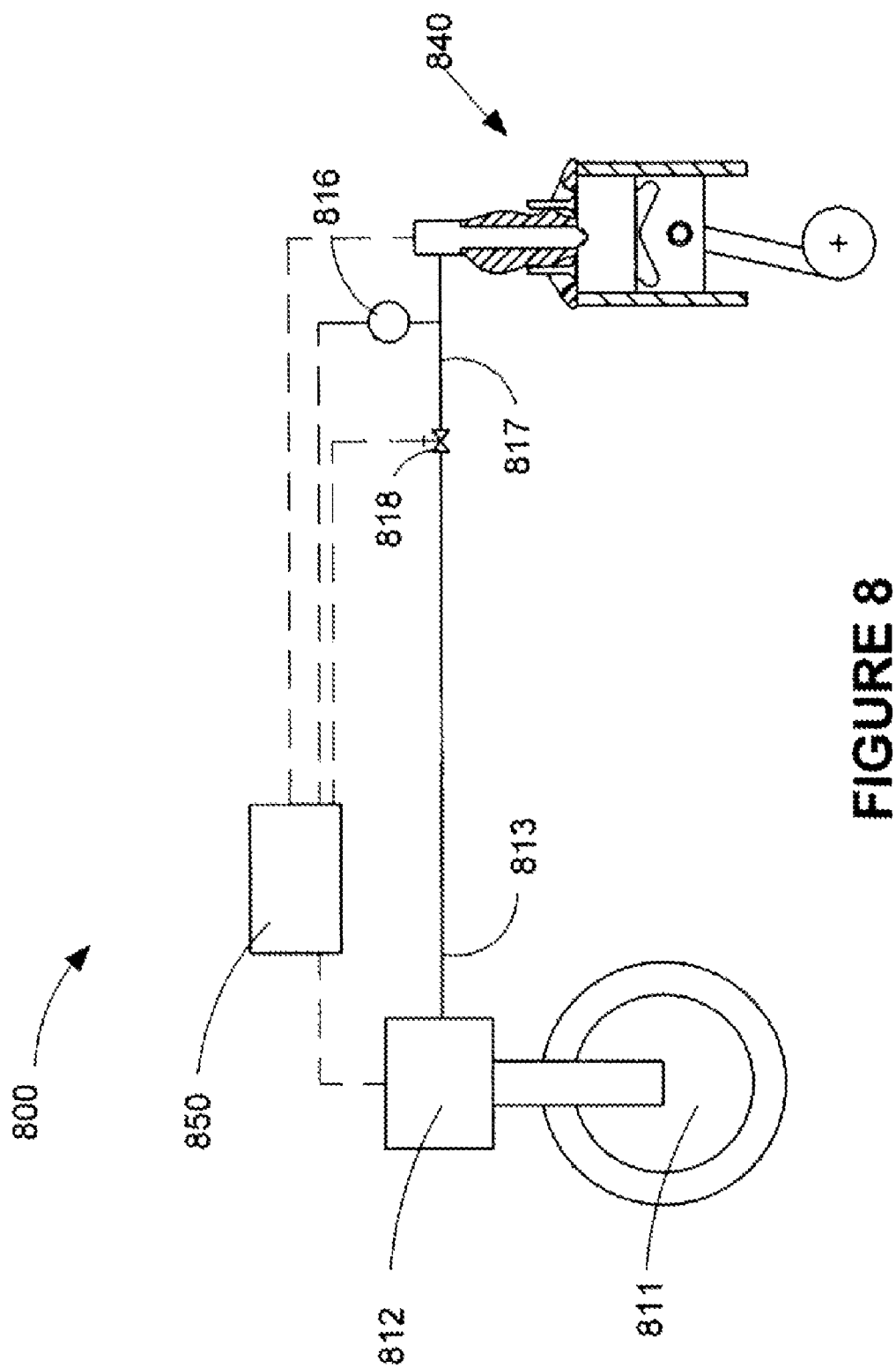
FIG. 8 is a schematic view of generic gaseous-fuelled internal combustion engine system that can be used to practice the disclosed method.

The present invention has been described with regard to several illustrative embodiments. However, it will be apparent to persons skilled in the art that a number of variations and modifications can be made without departing from the scope of the invention as defined in the claims. The invention described above applies therefore to any other internal combustion engine system 800 illustrated in FIG. 8, which comprises a fuel storage tank 811, a pump 812, a gas supply line 813, a gas rail 817, a pressure sensor 816, a metering valve 818 and a fuel injection subsystem 840. All of the algorithms described herein can be programmed into the control strategy that is followed by controller 850 similarly to controllers 150 or 260 (shown in FIGS. 1 and 2, respectively).

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A fuel injection control method for an internal combustion engine fuelled with a gaseous fuel that is injected directly into a combustion chamber through a fuel injection valve, the method comprising:
   (i) receiving input data indicating values associated with engine speed and a pre-selected parameter indicative of engine operating conditions, and a parameter indicative of an engine state that is one of a predefined plurality of engine states, and
   (ii) during each engine's compression stroke, controlling injection of the gaseous fuel according to the values associated with engine speed and the pre-selected parameter indicative of the engine operating conditions, as a function of the value associated with the parameter indicative of the engine state.

2. The method of claim 1 wherein the plurality of predefined engine states comprises a normal operation mode, a particulate filter regeneration mode, an engine protection mode, a high transient load mode, a low transient load mode or an engine mode corresponding to the altitude at which the engine is operating.

3. The method of claim 1 wherein the pre-selected parameter indicative of the engine operating conditions is one of a total fuelling amount, an engine load, an engine torque, a throttle position, or an intake manifold pressure.

4. The method of claim 1 wherein controlling the injection of the gaseous fuel comprises controlling gaseous fuel rail pressure or timing for gaseous fuel injection.

5. The method of claim 4 wherein the gaseous fuel rail pressure is selected from one of a plurality of look-up tables, which are each associated with one of the predefined plurality of engine states, wherein the table values correct gaseous fuel rail pressure based on the engine speed and the total fuelling amount, and the selected gaseous fuel rail pressure is selected from the table associated with the engine state that matches the input data associated with the engine state.

6. The method of claim 1 wherein controlling the injection of the gaseous fuel comprises controlling on-time for gaseous fuel injection.

7. The method of claim 6 wherein the on-time for gaseous fuel injection is selected from one of a plurality of look-up tables, which are each associated with one of the predefined plurality of engine states, wherein the table values correct on-time based on gaseous fuel fuelling values for gaseous fuel injection, and the selected on-time is selected from the table associated with the engine state that matches the input data associated with the engine state.

8. The method of claim 7 wherein the on-time values for gaseous fuel injection from the look-up tables are corrected by a correction factor obtained from look-up tables that correlate the correction factor to engine speed and gaseous fuel fuelling based on the engine state.

9. The method of claim 8 wherein the on-time values for gaseous fuel injection are further corrected by a correction factor dependent on gaseous fuel rail pressure and the engine state.

10. The method of claim 1 further comprising controlling a plurality of pilot fuel injection parameters according to engine speed and the pry selected parameter indicative of\ the engine operating conditions, based on the parameter indicative of the engine state.

11. The method of claim 10 wherein the plurality of pre-defined engine states comprises a normal operation mode, a particulate filter regeneration mode, an engine protection mode, a high transient load mode, a low transient load mode or an engine mode corresponding to the altitude at which the engine is operating.

12. The method of claim 10 wherein the pre-selected parameter indicative of the engine operating conditions is one of a total fuelling amount, an engine load, an engine torque, a throttle position or an intake manifold pressure.

13. The method of claim 10 wherein pilot fuel rail pressure is one of the pilot fuel injection parameters.

14. The method of claim 13 wherein the pilot fuel rail pressure is selected from one of a plurality of look-up tables, which are each associated with one of the predefined plurality of engine states, wherein the table values correct pilot fuel rail pressure based on the engine speed and the total fuelling amount, and the selected pilot fuel rail pressure is selected from the table associated with the engine state that matches the input data associated with the engine state.

15. The method of claim 10 wherein pilot on-time is one of the pilot fuel injection parameters.

16. The method of claim 15 wherein the pilot on-time is selected from one of a plurality of look-up tables, which are each associated with one of the predefined plurality of engine states, wherein the table values correct the pilot on-time based on pilot fuel fuelling values and the selected pilot on-time is selected from the table associated with the engine state that matches the input data associated with the engine state.

17. The method of claim 16 wherein the pilot on-time value is further corrected by another correction factor obtained from one of a plurality of look-up tables, which are each associated with one of the predefined plurality of engine states, wherein the table values correct the pilot on-time based on measured pilot fuel rail pressure, and the further corrected pilot on-time is selected from the table associated with the engine state that matches the input data associated with the engine state.

18. The method of claim 16 wherein the pilot fuel fuelling value is selected from one of a plurality of look-up tables, which are each associated with one of the predefined plurality of engine states, wherein the table values correct pilot fuel fuelling values based on the engine speed and the total fuelling amount and the selected pilot fuel fuelling value is selected from the table associated with the engine state that matches the input data associated with the engine state.

19. The method of claim 18 wherein the pilot fuel fuelling values are corrected by a multiplication factor based on a measured engine coolant temperature.

20. The method of claim 10 wherein one of the engine states is run-on-pilot whereby an on-time for gaseous fuel injection is set to zero.

21. The method of claim 10 wherein pilot fuel injection timing is one of the pilot fuel injection parameters.

22. The method of claim 21 wherein the pilot fuel injection timing is selected from a plurality of pilot fuel injection timing values corresponding to the engine state, each being calculated depending on a pilot on-time and on a separation time and taking into consideration a gaseous fuel injection timing.

23. The method of claim 22 wherein the separation time is selected from one of a plurality of look-up tables that correlate the separation time to the engine speed and to the total fuelling amount based on the engine state, and the selected separation time is selected from the table associated with the engine state that matches the input data associated with the engine state.

24. A fuel injection control method for an internal combustion engine system that is fuelled with a gaseous fuel that is injected directly into a combustion chamber, the method comprising:
  (a) receiving data inputs comprising engine speed, a total fuelling amount based on a commanded engine output, and a parameter indicative of an engine state;
  (b) accessing a plurality of tables, each one of the plurality of tables being filled with correction data associated with a different predefined engine state wherein the correction data correlates to at least one of the other data inputs; and
  (c) retrieving a correction factor from a selected one of the plurality of tables that is associated with the engine state data input and applying the correction factor to calculate a corrected fuel injection parameter that is used for controlling injection of the gaseous fuel.

25. The method of claim 24 wherein the predefined engine states comprise at least two of: (i) a normal operation mode, (ii) a particulate filter regeneration mode, (iii) an engine protection mode, (iv) a high transient load mode, (v) a low transient load mode, and (vi) an engine mode corresponding to the altitude at which the engine is operating.

26. The method of claim 24 wherein gaseous fuel rail pressure is one of the corrected fuel injection parameters.

27. The method of claim 24 wherein on-time for gaseous fuel injection is one of the corrected fuel injection parameters.

28. The method of claim 24 further comprising correcting the corrected fuel injection parameter with more than one correction factor, the method comprising:
  (a) retrieving an additional correction factor by accessing additional tables, each one of the additional tables being filled with correction data associated a different predefined engine state, wherein the correction data correlates to at least one of the other data inputs; and (b) correcting the corrected fuel injection parameter a second time by applying to it the additional correction factor to calculate a twice corrected fuel injection parameter.

29. The method of claim 28 wherein on-time for gaseous fuel injection is the corrected fuel injection parameter which is corrected first based on gaseous fuel fuelling values and is corrected a second time based on the engine speed and gaseous fuel rail pressure.

30. The method of claim 24 further comprising determining a second corrected fuel injection parameter, the method comprising:
(a) accessing a second plurality of tables, each one of the plurality of tables being filled with correction data for the second corrected fuel injection parameter that is associated with a different predefined engine state wherein the correction data correlates to at least one of the corrected fuel injection parameter and one of the other data inputs;
(b) retrieving a second correction factor from a selected one of the second plurality of tables that is associated with the engine state data input and calculating the second corrected fuel injection parameter.

31. The method of claim 30 wherein the corrected fuel injection parameter is gas rail pressure and the second corrected fuel injection parameter is on-time for gaseous injection.

32. The method of claim 24 wherein the corrected fuel injection parameter is at least one pilot fuel injection parameter.

33. The method of claim 32 wherein the at least one pilot fuel injection parameter is at least one of pilot fuel rail pressure, pilot on-time and pilot fuel injection timing.

34. The method of claim 33 wherein the pilot on-time is determined based on a data input indicating a pilot fuel fuelling value that is corrected by retrieving correction factors based on measured pilot rail pressure values.

35. The method of claim 34 wherein the pilot fuel fuelling value is corrected by a multiplication factor based on a measured engine coolant temperature.

36. The method of claim 33 wherein the pilot fuel injection timing is calculated depending on a pilot on-time and a separation time and taking in consideration a gaseous fuel injection timing.

\* \* \* \* \*

UNITED STATES PATENT AND TRADEMARK OFFICE
CERTIFICATE OF CORRECTION

| | | |
|---|---|---|
| PATENT NO. | : 8,028,676 B2 | Page 1 of 1 |
| APPLICATION NO. | : 12/906996 | |
| DATED | : October 4, 2011 | |
| INVENTOR(S) | : Richard Ancimer et al. | |

It is certified that error appears in the above-identified patent and that said Letters Patent is hereby corrected as shown below:

On the title page item [75]: the city for inventor Gret A. BATENBURG should be --Delta--, not Delte.

Signed and Sealed this
Third Day of January, 2012

David J. Kappos
*Director of the United States Patent and Trademark Office*